US00RE38272E

(19) United States
(12) Reissued Patent
Nation

(10) Patent Number: US RE38,272 E
(45) Date of Reissued Patent: Oct. 14, 2003

(54) GOLF CART FRAME ENCLOSURE ATTACHMENT DEVICE

(75) Inventor: Roger F. Nation, Brandon, FL (US)

(73) Assignee: Annwil, Inc., a Fla. corp., Tampa, FL (US)

(21) Appl. No.: 10/139,859

(22) Filed: May 3, 2002

Related U.S. Patent Documents

Reissue of:
(64) Patent No.: 6,206,447
Issued: Mar. 27, 2001
Appl. No.: 09/401,881
Filed: Sep. 23, 1999

(51) Int. Cl.[7] ..... B60J 1/00
(52) U.S. Cl. ..... 296/77.1; 296/81; 296/84.1; 296/83; 296/145; 160/387; 160/368.1
(58) Field of Search ..... 296/77.1, 81, 84.1, 296/83, 145; 160/402, 387, 399, 368.1, 180

(56) References Cited

U.S. PATENT DOCUMENTS 1,807,478 A * 5/1931 Isaacson ..... 160/385
2,416,448 A * 2/1947 Lepox ..... 160/387
2,533,216 A * 12/1950 Bixter ..... 160/387
4,013,315 A * 3/1977 West ..... 296/83
4,773,694 A * 9/1988 Gerber ..... 296/77.1
4,930,835 A * 6/1990 Bruce et al. ..... 296/77.1
5,217,275 A * 6/1993 Ridge ..... 296/77.1
5,310,235 A * 5/1994 Seymour et al. ..... 296/77.1
5,368,085 A * 11/1994 Ruparelia ..... 160/368.1
5,732,759 A * 3/1998 Wang ..... 160/370.21
5,788,317 A * 8/1998 Nation ..... 296/141
5,894,642 A * 4/1999 Eberhardt ..... 160/368.1
5,921,389 A * 7/1999 Zoffer ..... 296/136.1
5,954,385 A * 9/1999 Moore et al. ..... 296/84.1
5,975,615 A * 11/1999 Showalter ..... 296/84.1
6,007,134 A * 12/1999 Weston ..... 296/83

* cited by examiner

*Primary Examiner*—Stephen T. Gordon
*Assistant Examiner*—Lori L. Coletta
(74) *Attorney, Agent, or Firm*—Edward M. Livingston, Esq.

(57) ABSTRACT

An attachment device (1) secures an enclosure to the roof frame (2) of a golf cart has a sleeve portion which wraps around the frame (2) and is secured by zipper teeth (9). An optional flap ([14]*15*) extending from the sleeve portion has attachment means to secure an enclosure. Opening slots (13) in the flap allow windshield opening release brackets (7) to be inserted therethrough.

14 Claims, 3 Drawing Sheets

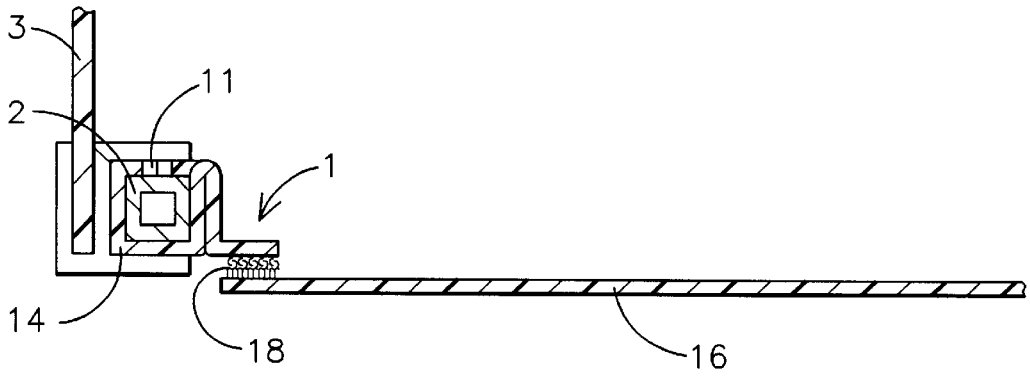
*FIG. 6* (NEW)
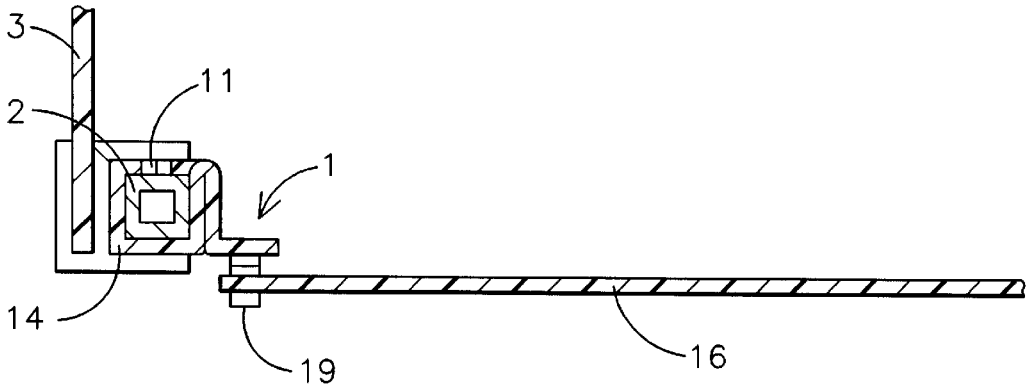
*FIG. 7* (NEW)

GOLF CART FRAME ENCLOSURE ATTACHMENT DEVICE

Matter enclosed in heavy brackets [ ] appears in the original patent but forms no part of this reissue specification; matter printed in italics indicates the additions made by reissue.

BACKGROUND OF THE INVENTION

This invention relates to golf cart enclosures and more particularly to a device for attaching the sides of enclosures to the legs of a roof frame on a golf cart.

Currently golf cart enclosures made of vinyl or similarly flexible material attach directly to the frame of a golf cart by snaps or hook and loop fastening material. Such attachment means require that the fastening material or snaps be attached to the frame of the golf cart itself. Also, hook and loop fastening material wears out and has to be replaced. Furthermore, such enclosure attachment means cannot be used with all types of windshields made for golf carts. Thus, some golf carts even require frames be specially extruded to allow attachment of an enclosure and still allow windshields to be used therewith.

Thus, a need exists for an attachment device to secure an enclosure to a golf cart frame that does not require modification to the frame itself, that is durable, easy to use and which can be used with all types of windshields.

The prior art does not contain any enclosure attachment means other than that mentioned above. Unlike the prior art the present invention provides an attachment device that forms a sleeve around the legs of a golf cart roof frame. A zipper extending from the sleeve itself or a flap attached to the sleeve allows the enclosure to be attached thereto without modification to the golf cart frame itself. One or more opening slots in the flap allows various windshield opening attachment brackets to be inserted therethrough.

SUMMARY OF THE INVENTION

The primary object of the present invention is to provide a device for securing a golf cart enclosure to a frame of a golf cart.

An ancillary object of the present invention is to provide an attachment device that does not require affixing or fastening attachment means directly and permanently to the frame or requiring a special frame be made.

Another object of the present invention is to provide such a device that can be utilized for all types of golf cart windshields.

Another object of the present invention is to provide such an attachment device that allows for easy removability of enclosures.

A further object of the present invention is to provide an attachment device that does not have frame attachment means that wear out easily.

An even further object of the present invention is to provide such an attachment device that reduces the labor and cost associated with current enclosure attachment means used with windshields.

The present invention fulfills the above and other objects by providing an attachment device having an elongated piece of flexible material having a set of front zipper teeth running lengthwise along a frame attachment side and a second set of sipper teeth also running lengthwise a sufficient space apart from the front teeth zipper so that when the two (2) sets of zipper teeth are interlocked around a leg of a golf cart frame a sleeve is forced to securely hold the attachment to the frame. Additionally, on the enclosure attachment side, a flap of flexible material may extend from the sleeve which has attachment means, such as a zipper, to mate with like attachment means of a golf cart enclosure. Although the enclosure attachment means may be snaps or hook and loop fastening material like VELCRO®, it would preferably be a zipper teeth which would interlock with a second set of zipper teeth on the enclosure. The attachment device of the present invention may also have one or more opening slots in the flap through which removably releasable brackets for opening a windshield could be inserted.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

*FIG. 6 is a to view showing the attachment device of the present invention with windshield in place and attached enclosure using hook and loop fastening material; and*

*FIG. 7 is a top view showing the attachment device of the present invention with windshield in place and attached enclosure using snaps as the fastening means.*

DESCRIPTION OF THE PREFERRED EMBODIMENT

Figure 1:
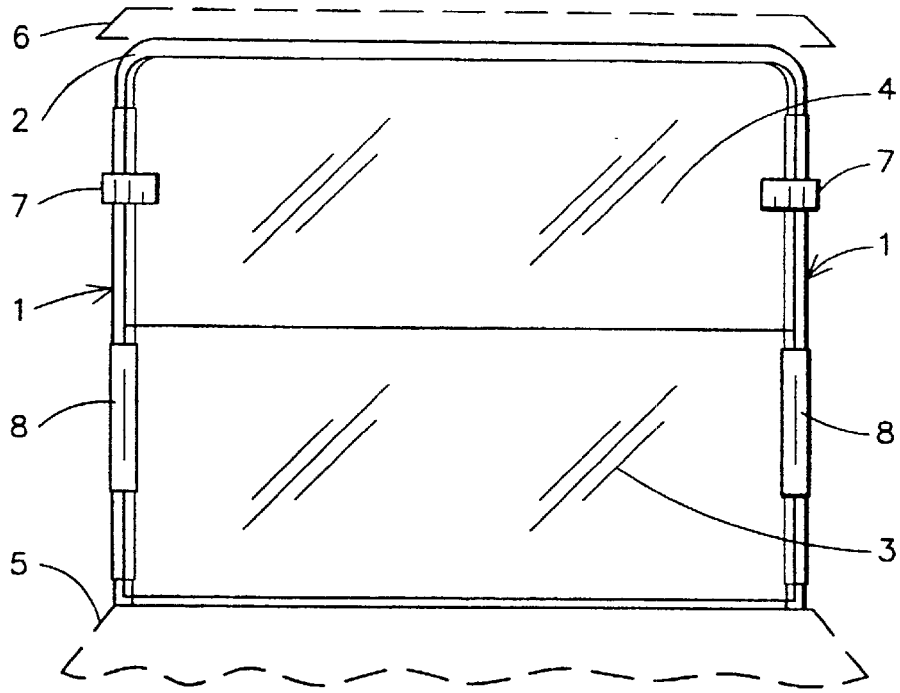
FIG. 1 is a front view of a windshield mounted to a roof frame of a golf cart vehicle with the attachment device of the present invention secured around each leg of the roof frame of the golf cart.

Only for purposes of describing a preferred embodiment, the terminology used in reference to the numbered components in the drawings is as follows:

| | |
|---|---|
| 1. attachment device of present invention | 10. zipper pull tab |
| 2. roof/windshield frame | 11. frame attachment zipper teeth |
| 3. lower half of windshield | 12. frame attachment zipper pull tab |
| 4. fold down top half of windshield | 13. slot for side release bracket |
| 5. golf cart hood | 14. frame attachment sleeve |
| 6. golf cart roof | 15. enclosure attachment flap |
| 7. upper release bracket for windshield | 16. enclosure |
| 8. lower wind shield holding brackets | 17. unlocking frame attachment zipper teeth |
| 9. enclosure attachment zipper teeth | *18. hook and loop fastening material* |
| | *19. snaps* |

Referring now to the drawings FIG. 1 shows the standard golf cart roof/windshield frame 2 mounted on top of a hood of a vehicle 5 and supporting a roof 6. A windshield having two parts, a lower fixed closed section 3 and an upper openable section 4 made of plexiglass material is shown attached by holding brackets 8 to each side of the frame 2. The upper section 4 can be flipped downward over the bottom half 3 by releasing brackets 7 from the roof frame so that more air can be provided to the occupants.

Normally, an enclosure is provided for a golf cart which covers the sides and back of a golf cart in order to protect the occupants from wind, rain and other unfavorable weather conditions. Traditionally, the enclosure is secured to the frame by snaps or hook and loop fastening material permanently affixed to the leg of the roof frame. In the present invention however, an attachment device 1 is provided that wraps around each side of the roof frame 2 so that the windshield 3 and 4 can be easily secured to it by conventional holding brackets 8 which are pressure-fitted around the outside of the attachment device 1 so that the attachment device of the present invention can be used with all present types of windshields without modification of the frame 2.

Figure 2:
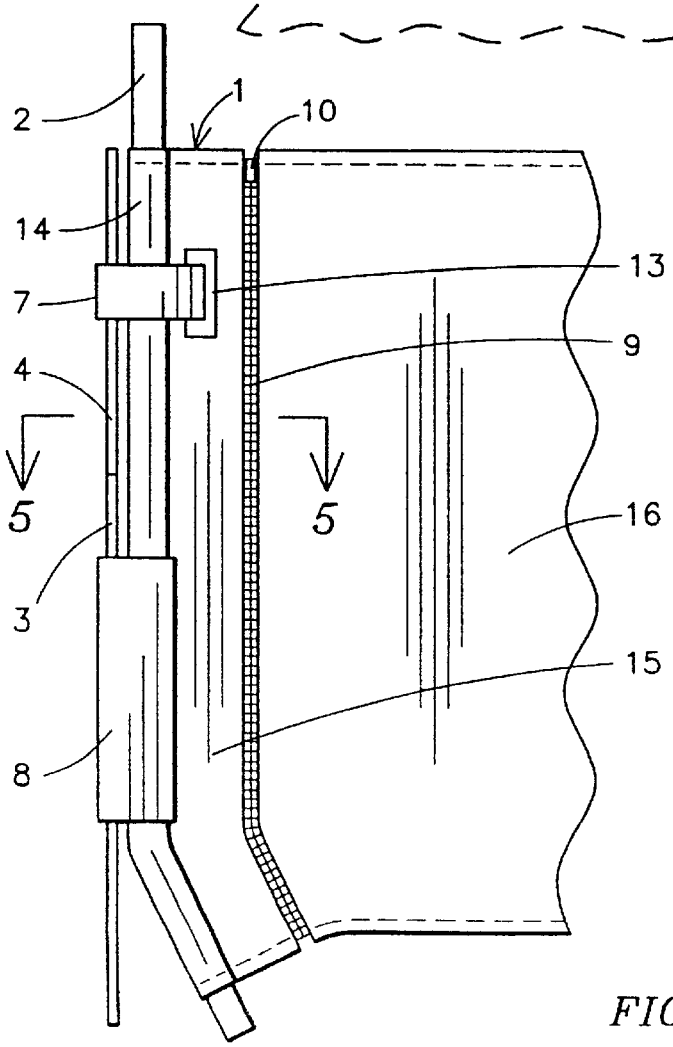
FIG. 2 is a side view of a golf cart frame showing the attachment device of the present invention secured around the roof frame with the windshield with an enclosure.

In FIG. 2 the attachment device of the present invention 1 is shown attached to one leg of the roof frame 2 and having an enclosure 16 attached thereto. The attachment device has a sleeve section 14 which wraps around a leg of the golf cart roof frame 2. A flap 15 extends from the sleeve section 14 which has attachment means consisting of zipper teeth 9 that interlocks with an enclosure 16 by pulling on zipper tab 10. Although snaps or hook and loop fastening material might also be used to attach the enclosure 16 to the flap 15, a zipper is preferred due to ease of use and durability. One or more slots like slot 13 may be provided in the extension flap 15 so windshield release brackets 7 may pass through the extension flap. The holding brackets 8 for the windshield 3 will be secured around the attachment device of the present invention.

Figure 3:
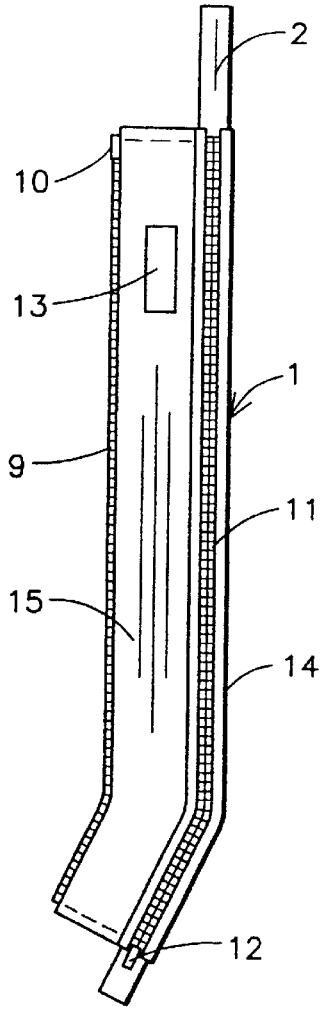
FIG. 3 is a side view showing the attachment device of the present invention from the side of the golf cart without a windshield in place.

FIG. 3 shows the enclosure attachment device as it would appear from the inside which shows the zipper teeth 11 with zipper tab 12 securing the attachment device like a sleeve around the frame 2 of the golf cart.

Figure 4:
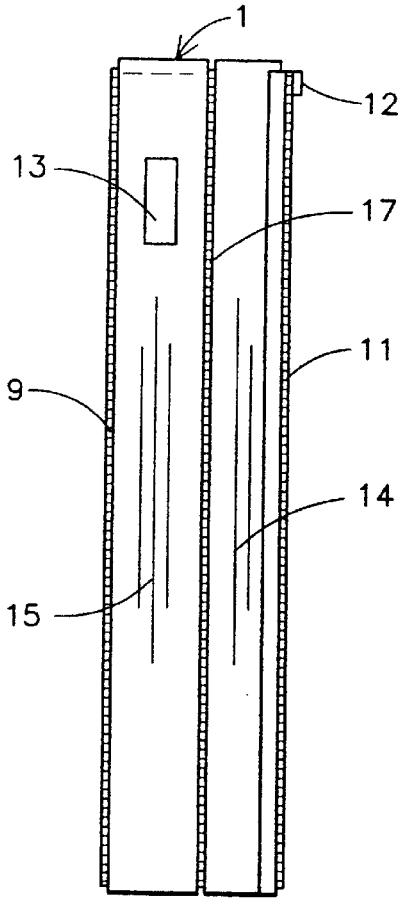
FIG. 4 is an elevation view of the inside of the attachment device in an open condition; [and]

FIG. 4 depicts the frame attachment device 1 from the inside in an opened condition to show the frame attachment zipper teeth 11 and matching interlocking zipper teeth 17 on each side of the frame sleeve portion 14 of the attachment device. The flap extending from the sleeve portion 14 has attachment means consisting of a zipper teeth 9 running lengthwise. An opening slot 13 in the enclosure attachment flap 15 allows windshield release brackets 7 to pass therethrough.

Figure 5:
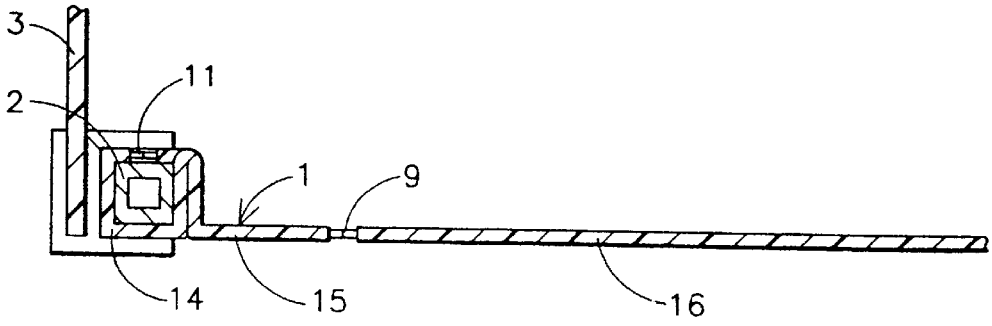
FIG. 5 is a top cross-section view along lines 5—5 of FIG. 2 showing the attachment device of the present invention with windshield in place and attached enclosure[.]

FIG. 5 shows the attachment device 1 or sleeve portion 14 wrapped around a leg of the roof frame 2 secured by zipper teeth 11 with an enclosure attachment flap 15 extending therefrom to which a golf cart enclosure 16 is secured by zipper teeth 9.

*FIG. 6 shows the attachment device 1 wherein a golf cart enclosure 16 is secured to the sleeve portion 14 by hook and loop fastening material 18 instead of zipper teeth.*

*FIG. 7 shows the attachment device 1 wherein a golf cart enclosure 16 is secured to the sleeve portion 14 by snaps 19 instead of zipper teeth.*

Thus, as described, the present invention provides a novel and non obvious means for attaching a golf cart enclosure to a golf cart roof frame without having to alter the frame in anyway which can accommodate any type of windshield.

Although only a few embodiments of the present invention have been described in detail hereinabove, all improvements and modifications to this invention within the scope or equivalents of the claims are included as part of this invention.

Having thus described my invention,

I claim:

1. A golf cart frame enclosure attachment device comprising:

a elongated piece of flexible material having a first attachment means running lengthwise along a frame attachment side and a second attachment means running lengthwise a sufficient space apart from the first attachment means so when the sets of attachment means are interconnected around a leg of [the] *a* frame of a golf cart, a sleeve is formed around the leg of the frame; *and*

[an extension flap connected to the sleeve; and]

means for attaching an enclosure to the [extension flap] *sleeve from an enclosure attachment side of the device.*

2. The golf cart frame enclosure attachment device of claim 1 wherein the first and second attachment means are interlocking zipper teeth.

3. The golf cart frame enclosure attachment device of claim 1 wherein the means for attaching the enclosure is *an extension flap which extends from the sleeve, said extension flap having* a first set of zipper teeth [on the extension flap] which interlock with a matching second set of zipper teeth on the enclosure.

4. The golf cart frame enclosure attachment device of claim 2 wherein the means for attaching the enclosure is *an extension flap which extends from the sleeve, said extension flap having* a first set of zipper teeth [on the extension flap] which interlock with a matching second set of zipper teeth on the enclosure.

5. The golf cart frame enclosure attachment device of claim [1] *3* wherein the attachment device further comprises at least one opening slot in the extension flap for inserting therethrough windshield release brackets.

6. The golf cart frame enclosure attachment device of claim [2] *4* wherein the attachment device further comprises at least one opening slot in the extension flap for inserting therethrough windshield release brackets.

[7. The golf cart frame enclosure attachment device of claim 3 wherein the attachment device further comprises having at least one opening slot in the extension flap for inserting windshield release brackets through the at least one opening slot.]

[8. The golf cart frame enclosure attachment device of claim 4 wherein the attachment device further comprises having at least one opening in the extension flap slot for inserting windshield release brackets through the at least one opening slot.]

*9. The golf cart frame enclosure attachment device of claim 1 wherein the means for attaching the enclosure is hook and loop fastening material which interlocks with matching hook and loop fastening material on the enclosure.*

*10. The golf cart frame enclosure attachment device of claim 2 wherein the means for attaching an enclosure is hook and loop fastening material which interlocks with matching hook and loop fastening material on the enclosure.*

*11. The golf cart frame enclosure attachment device of claim 1 wherein the means for attaching an enclosure is snaps.*

*12. The golf cart frame enclosure attachment device of claim 2 wherein the means for attaching to an enclosure is snaps.*

*13. The golf cart frame enclosure attachment device of claim 9 wherein the attachment device further comprises a flap having at least one opening slot for inserting windshield release brackets through the at least one opening slot.*

*14. The golf cart frame enclosure attachment device of claim 10 wherein the attachment device further comprises a*

*flap having at least one opening slot for inserting windshield release brackets through the at least one opening slot.*

*15. The golf cart frame enclosure attachment device of claim 11 wherein the attachment device further comprises a flap having at least one opening slot for inserting windshield release brackets through the at least one opening slot.*

*16. The golf cart frame enclosure attachment device of claim 12 wherein the attachment device further comprises a flap having at least one opening slot for inserting windshield release brackets through the at least one opening slot.*

* * * * *